US010458882B2

(12) United States Patent
Fujioka et al.

(10) Patent No.: US 10,458,882 B2
(45) Date of Patent: Oct. 29, 2019

(54) ELEMENT PROVIDED WITH PORTION FOR POSITION DETERMINATION AND MEASURING METHOD

(71) Applicant: NALUX CO., LTD., Osaka-shi, Osaka (JP)

(72) Inventors: Takahiro Fujioka, Osaka (JP); Katsumoto Ikeda, Osaka (JP)

(73) Assignee: NALUX CO., LTD., Osaka-shi, Osaka (JP)

( * ) Notice: Subject to any disclaimer, the term of this patent is extended or adjusted under 35 U.S.C. 154(b) by 290 days.

(21) Appl. No.: 15/664,193

(22) Filed: Jul. 31, 2017

(65) Prior Publication Data
US 2018/0045603 A1     Feb. 15, 2018

(30) Foreign Application Priority Data

Aug. 9, 2016 (JP) .................................. 2016-156462

(51) Int. Cl.
*G01M 11/02* (2006.01)
*G06T 7/70* (2017.01)
(Continued)

(52) U.S. Cl.
CPC .......... *G01M 11/025* (2013.01); *G01B 11/26* (2013.01); *G01M 11/0221* (2013.01); *G02B 6/4221* (2013.01); *G06T 7/60* (2013.01); *G06T 7/70* (2017.01); *G06T 7/74* (2017.01); *G06T 2207/30204* (2013.01)

(58) Field of Classification Search
CPC .... G06T 7/74; G01M 11/0221; G01M 11/025
See application file for complete search history.

(56) References Cited

U.S. PATENT DOCUMENTS 4,837,449 A * 6/1989 Maltby, Jr. ......... G01B 11/2433
                                                    250/559.11
5,767,960 A * 6/1998 Orman ................. G01B 11/002
                                                    356/139.03
(Continued)

FOREIGN PATENT DOCUMENTS

JP          52-63032        5/1977
JP          11-328404 A    11/1999
(Continued)

OTHER PUBLICATIONS

First Office Action dated Mar. 21, 2017 corresponding to Japanese Patent Application No. 2016-156462.
(Continued)

*Primary Examiner* — Shawn Decenzo
(74) *Attorney, Agent, or Firm* — Squire Patton Boggs (US) LLP (57) ABSTRACT

A method for measuring a position of a target surface provided with portions for position determination thereon, wherein a diffuse reflectance of the target surface is 0.1% or less, and a diffuse reflectance of the portions for position determination is 5% or more, and wherein the target surface is configured such that a tangential plane at any point on the target surface where each of the portions for position determination is installed forms an arbitrary angle between 15 degrees and 75 degrees inclusive with a certain direction, the method including the steps of illuminating the target surface with parallel light in the certain direction; determining positions of border lines of the plural portions for position determination from an image of the target surface; and determining the position of the target surface from the positions of the border lines of the plural portions for position determination.

12 Claims, 10 Drawing Sheets

(51) Int. Cl.
*G02B 6/42* (2006.01)
*G06T 7/60* (2017.01)
*G01B 11/26* (2006.01)
*G06T 7/73* (2017.01)

(56) References Cited

U.S. PATENT DOCUMENTS

| | | | |
|---|---|---|---|
| 2010/0123904 A1* | 5/2010 | Yamakawa | G01B 11/02 356/614 |
| 2012/0026486 A1* | 2/2012 | Jeng | G03F 9/703 356/138 |
| 2013/0194569 A1 | 8/2013 | Lee et al. | |
| 2017/0350695 A1* | 12/2017 | Fujioka | G01B 11/26 |
| 2017/0365065 A1* | 12/2017 | Stigwall | G06T 7/55 |
| 2018/0045603 A1* | 2/2018 | Fujioka | G06T 7/70 |

FOREIGN PATENT DOCUMENTS

| | | |
|---|---|---|
| JP | 2005-030793 A | 2/2005 |
| JP | 2006-058149 A | 3/2006 |
| JP | 2008-216905 A | 9/2008 |
| JP | 2011-179885 A | 9/2011 |
| JP | 2013-545972 A | 12/2013 |
| JP | 2014-137410 A | 7/2014 |

OTHER PUBLICATIONS

Second Office Action dated May 30, 2017 corresponding to Japanese Patent Application No. 2016-156462.

* cited by examiner

ELEMENT PROVIDED WITH PORTION FOR POSITION DETERMINATION AND MEASURING METHOD

BACKGROUND

Field

The present invention relates to an element provided with portions for position determination and a measuring method.

Description of the Related Art

In an element provided with a prism surface, for example, a value of an angle that the prism surface forms with another surface through which a light beam passes has to be guaranteed with a high accuracy. Accordingly, the angle that the prism surface forms with another surface through which a light beam passes has to be measured with a high accuracy. When an angle that two surfaces of an element form is measured, conventionally the element is cut by an appropriate plane, and the angle that the two surfaces form is measured in the section. However, the conventional measuring method has the following problems. Firstly, cutting an element requires a lot of trouble. Secondly, a deformation of the element due to the cutting and burrs generated by the cutting prevent a high-accuracy measurement of the angle. Thirdly, measurement values vary depending on a section that is selected. Thus, it is difficult to measure the angle that the two surfaces form with a high accuracy by the conventional measuring method.

On the other hand, methods for aligning two elements by the use of a position marker that corresponds to a portion for position determination have been developed conventionally (Patent document 1 and Patent document 2). However, a method for measuring an angle that two surfaces of an element form by the use of portions for position determination and an element that is configured such that an angle that two surfaces of the element form can be measured by the use of portions for position determination have not been developed.

PRIOR ART DOCUMENTS

Patent Documents

Patent document 1: JP2008-216905A
Patent document 2: JP2014-137410A

SUMMARY OF INVENTION

Problem to be Solved by the Invention

In general, there is a need for a method for measuring a position of a surface or an angle that two surfaces of an element form by the use of portions for position determination and an element that is configured such that an angle that two surfaces of the element form can be measured by the use of portions for position determination.

Means for Solving the Problem

A method according to the first aspect of the present invention is a method for measuring a position of a target surface provided with portions for position determination thereon, wherein a diffuse reflectance of the target surface is 0.1% or less, and a diffuse reflectance of the portions for position determination is 5% or more, and wherein the target surface is configured such that a normal to a tangential plane at any point on the target surface where each of the portions for position determination is installed forms an arbitrary angle between 15 degrees and 75 degrees inclusive with a certain direction. The method includes the steps of illuminating the target surface with parallel light in the certain direction; determining positions of border lines of the plural portions for position determination from an image of the target surface; and determining the position of the target surface from the positions of the border lines of the plural portions for position determination.

In the method according to the present aspect, the position of the target surface can measured with a high accuracy by precisely determining the positions of the border lines of the plural portions for position determination.

In a method according to the first embodiment of the first aspect of the present invention, the target surface is a surface of an element provided with a first plane and a second plane forming an angle between 15 degrees and 75 degrees inclusive with the first plane, the target surface is the second plane, and the element is provided with at least three portions for position determination on the second plane, the portions for position determination being arranged such that spacing between the portions for position determination is great enough to locate the second plane. In the step of illuminating the target surface, the second plane is illuminated with parallel light that is perpendicular to the first plane.

In the method according to the present embodiment, the position of the second plane can measured with a high accuracy by precisely determining the positions of the border lines of the at least three portions for position determination.

A method according to the second embodiment of the first aspect of the present invention further includes the step of determining an angle between the first plane and the second plane using the positions of the second plane.

In the method according to the present embodiment, the angle between the first plane and the second plane can be measured with a high accuracy using the positions of the second plane. In other words, in the method according to the present embodiment, the element need not be cut by a plane for measurement of an angle. Accordingly, a lot of trouble for cutting the element is not required, the accuracy of measurement will not deteriorate because of a deformation of the element due to the cutting and burrs generated by the cutting, and measurement values will not vary depending on a section that is selected.

In a method according to the third embodiment of the third aspect of the present invention, the position of each of the border lines of the at least three portions for position determination is obtained using plural pixels in the image.

According to the present embodiment, the position of each of the border lines of the at least three portions for position determination is obtained using plural pixels in the image, and therefore the accuracy of measurement can be further increased.

An element according to the second aspect of the present invention is an element having a first plane and a second plane that is at an angle between 15 degrees and 75 degrees inclusive with the first plane. The second plane is provided with at least three portions for position determination thereon, the portions for position determination being arranged such that spacing between the portions for position determination is great enough to locate the second plane. A diffuse reflectance of the second plane is 0.1% or less, and a diffuse reflectance of the portions for position determination is 5% or more.

In the element according to the present aspect, the position of the second plane can be determined with respect to the first plane by locating the border lines of the at least three portions for position determination, and thereby the angle that the first plane and the second plane form can be measured with a high accuracy. In other words, when in the element according to the present aspect, the angle that the first plane and the second plane form is measured, the element need not be cut by a plane for measurement of an angle. Accordingly, a lot of trouble for cutting the element is not required, the accuracy of measurement will not deteriorate because of a deformation of the element due to the cutting and burrs generated by the cutting, and measurement values will not vary depending on a section that is selected.

In an element according to the first embodiment of the second aspect of the present invention, the at least three portions for position determination are arranged on the periphery of the second plane.

According to the present embodiment, the position of the second plane can be determined with a high accuracy through the at least three portions for position determination arranged on the periphery of the second plane, and thereby the angle that the first plane and the second plane form can be measured with a high accuracy.

An element according to the second embodiment of the second aspect of the present invention is provided with four portions for position determination.

In an element according to the third embodiment of the second aspect of the present invention, each of the at least three position markers corresponds to a single portion for position determination.

An element according to the fourth embodiment of the second aspect of the present invention is the element according to the third embodiment wherein the length of the border line of each position marker is from 0.1 millimeters to 3.0 millimeters and the length of each position marker in the direction of the border line is equal to the length of the border line.

According to the present embodiment, a sufficient number of points of measurement can be arranged along the border line, each point of measurement having a size corresponding to the size of a single pixel.

An element according to the fifth embodiment of the second aspect of the present invention is provided with at least two position markers including at least one position marker corresponding to plural portions for position determination.

An element according to the sixth embodiment of the second aspect of the present invention is used for optical applications.

An element according to the seventh embodiment of the second aspect of the present invention is the element according to the sixth embodiment wherein at least one of the first plane and the second plane is a prism plane, a plane for arranging a lens or a plane for installing an optical fiber.

DESCRIPTION OF EMBODIMENTS

Figure 1:
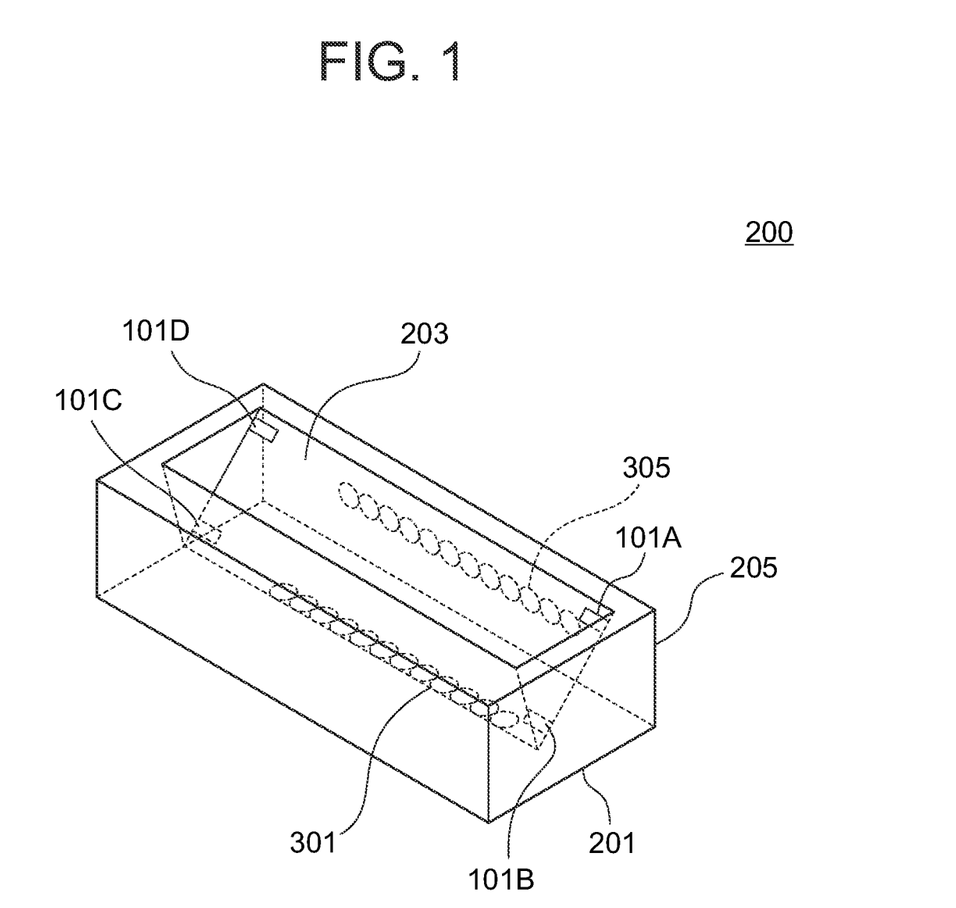
FIG. 1 illustrates an element according to an embodiment of the present invention.

FIG. 1 illustrates an element according to an embodiment of the present invention. The element according to the embodiment is an optical element 200 provided with a surface provided with lenses and a prism surface. The optical element 200 is provided with a reference plane 201, a plane 205 that is perpendicular to the reference plane 201 and a plane 203 that forms an angle (an acute angle) with the reference plane 201. The plane 203 is a prism surface. The reference plane 201 is provided with plural lenses 301 that are arranged in a straight line. Further, the plane 205 is provided with plural lenses 301 that are arranged in a straight line. Rays of light that travel in the direction perpendicular to the reference plane 201 and enters the plural lenses 301 that are arranged in a straight line on the reference plane 201 are reflected by the plane 203 in the optical element 200 and reach the plural lenses 305 that are arranged in a straight line on the plane 205. Thus, the optical element 200 is configured such that rays of light that travel in the direction perpendicular to the reference plane 201 and enters the plural lenses 301 that are arranged in a straight line on the reference plane 201 exit from the optical element 200 after having passed through the lenses 301 and the lenses 305. The plane 203 is provided with four position markers 101A 101B, 101C and 101D. Each of the four position markers 101A 101B, 101C and 101D is a surface generating diffuse reflection formed on the plane 203. In general, position markers of an optical element are installed outside the area that is used as an optical surface on a surface of the optical element.

The four position markers 101A 101B, 101C and 101D are used to measure the angle that the plane 203 forms with the reference plane 201. The reference plane 201 corresponds to a first plane, and the plane 203 corresponds to a second plane. The angle that the first plane and the second plane form is greater than 0 degree and smaller than 90 degrees.

Figure 2:
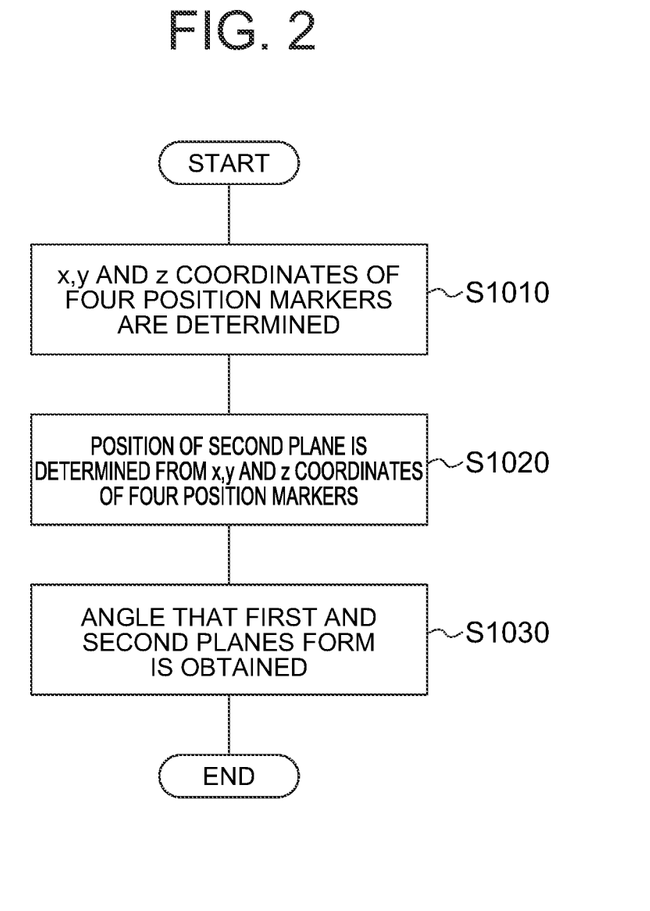
FIG. 2 is a flowchart for illustrating how to determine the angle between the first plane and the second plane by the use of the four position markers.

FIG. 2 is a flowchart for illustrating how to determine the angle between the first plane and the second plane by the use of the four position markers.

In step S1010 of FIG. 2, x, y and z coordinates of the four position markers are determined. An x-axis and a y-axis that are orthogonal to each other are determined in the first plane (reference plane) 201. A z-axis is determined such that it is orthogonal to the reference plane 201. How to determine x, y and z coordinates of the four position markers will be described in detail later. In general, a portion for determining x, y and z coordinates is referred to as a portion for position determination. In the present embodiment, the four position markers form four portions for position determination.

In step S1020 of FIG. 2, the position of the second plane is determined from the x, y and z coordinates of the four position markers. The position of the second plane may be determined by the method of least squares using the four sets of x, y and z coordinates.

In general, a position of a plane can be determined if the number of portions for position determination is three or more.

The four position markers 101A 101B, 101C and 101D are arranged such that spacing between them is great enough to locate the position of the second plane by the four sets of x, y and z coordinates. The four position markers may be arranged on the periphery of the second plane.

In step S1030 of FIG. 2, the angle that the first plane 201 and the second plane 203 form is obtained. The first plane 201 is contained in the xy plane, and the position of the second plane 203 has been determined by step S1020. Accordingly, the angle between the two planes can be obtained.

Further, in general, according to steps S1010 and S1020 of FIG. 2, a position of a plane can be determined by the use of position markers.

How to determine the x, y and z coordinates of the four position markers will be described below. By way of example, a method in which an image measuring system is used will be described.

Figure 3:
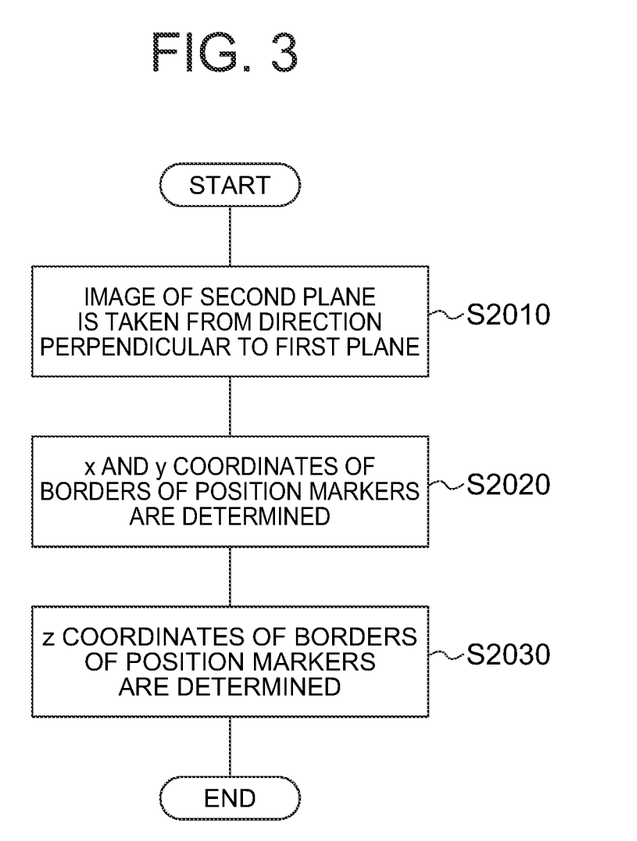
FIG. 3 is a flowchart for illustrating how to determine x, y and z coordinates of the four position markers.

FIG. 3 is a flowchart for illustrating how to determine x, y and z coordinates of the four position markers.

In step S2010 of FIG. 3, an image of the second plane 203 is taken from the direction perpendicular to the first plane (the reference plane) 201 with an image measuring system.

In step S2020 of FIG. 3, x and y coordinates of the borders of the four position markers are determined using the obtained image in the following procedure. An arbitrary pixel in the image is defined as the origin of the coordinate system. In the image, the pixels that correspond to the borders of the four position markers 101A 101B, 101C and 101D are determined. The x coordinates of the borders of the position markers are determined from the position in the x-axis direction of the pixel of the origin and the positions in the x-axis direction of the pixels corresponding to the borders of the position markers, and the y coordinates of the borders of the position markers are determined from the position in the y-axis direction of the pixel of the origin and the positions in the y-axis direction of the pixels corresponding to the borders of the position markers. The positions of the borders, that is, the edges of the position markers are determined by detecting differences in density of pixels in the image. Accordingly, it is important that the borders of the position markers are clearly displayed in the image. Accuracy of measurement using an image is restricted by pixel size of an image sensor of an image measuring system. When an image is taken through a microscope, the accuracy corresponding to the pixel size is approximately 0.5 micrometers, by way of example.

In step S2030 of FIG. 3, z coordinates of the borders of the position markers are determined. The z coordinates of the borders of the position markers may be determined by the use of an auto-focus function of the image measuring system. They may also be determined by the use of a noncontact displacement sensor using laser or the like.

Figure 4:
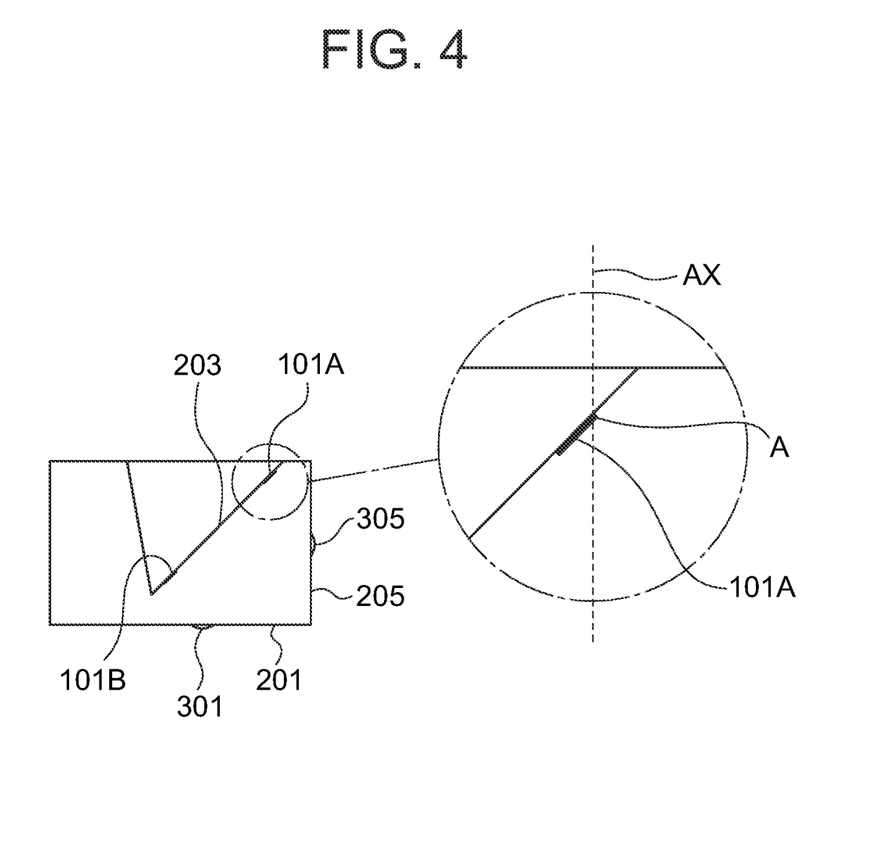
FIG. 4 shows a cross section of the element, the cross section being in the direction of the maximum angle of inclination of the second plane and perpendicular to the first plane.

FIG. 4 shows a cross section of the element 200, the cross section being in the direction of the maximum angle of inclination of the second plane 203 and perpendicular to the first plane 201. The encircled drawing shows an enlarged view of the cross section in the direction of the maximum angle of inclination of the second plane 203 and perpendicular to the first plane 201, of the position marker 101A and its vicinity. A line AX shows a straight line that passes through the border between the position marker 101A and the second plane 203 and is perpendicular to the first plane 201. The border line between the surface of the position marker 101A and the second plane 203 is perpendicular to the cross section shown in FIG. 4 and parallel to the first plane 201, and is represented by point A.

Figure 5:
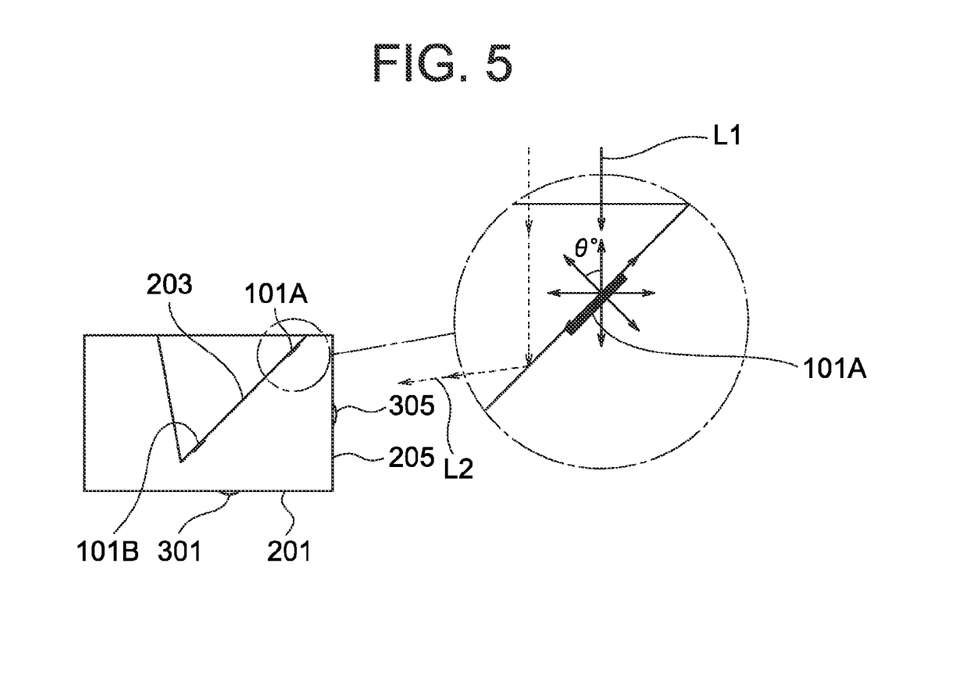
FIG. 5 shows a cross section of the element, the cross section being in the direction of the maximum angle of inclination of the second plane and perpendicular to the first plane, and paths of rays of light illuminating the position marker.

FIG. 5 shows a cross section of the element 200, the cross section being in the direction of the maximum angle of inclination of the second plane 203 and perpendicular to the first plane 201, and paths of rays of light illuminating the position marker. The encircled drawing shows an enlarged view of the cross section in the direction of the maximum angle of inclination of the second plane 203 and perpendicular to the first plane 201, of the position marker 101A and its vicinity. In the encircled drawing, paths of rays of light illuminating the position marker are shown. When an image that is parallel to the first plane 201 is taken with the image measuring system, the second plane 203 is illuminated by light travelling in the direction that is perpendicular to the first plane 201. The position marker 101A is a surface generating diffuse reflection, and therefore a portion of light L1 that reaches the position marker 101A in the vicinity of the border between the position marker 101A and the second plane 203 in the light travelling in the direction that is perpendicular to the first plane 201 is reflected in the direction that is perpendicular to the first plane 201 and travels toward the image measuring system. On the other hand, the second plane 203 is at an angle with the first plane 201 and generates no diffuse reflection, and therefore light L2 that reaches the second plane 203 in the light travelling in the direction that is perpendicular to the first plane 201 is not reflected in the direction toward the image measuring system. Accordingly, in an image taken with the image measuring system, the position of the border between the position marker 101A and the second plane 203 is clearly displayed.

In the description given above, an x-axis and a y-axis that are orthogonal to each other are determined in the first plane (reference plane) 201, the second plane 203 is illuminated by light travelling in the direction that is perpendicular to the first plane 201, and an image of the second plane 203 is taken from the direction that is perpendicular to the first plane (reference plane) 201. In general, an x-axis and a y-axis that are orthogonal to each other may be determined in a virtual plane that is perpendicular to the direction in which parallel light is made to travel for illumination. In this case, the first plane as the reference plane is not required.

Figure 6:
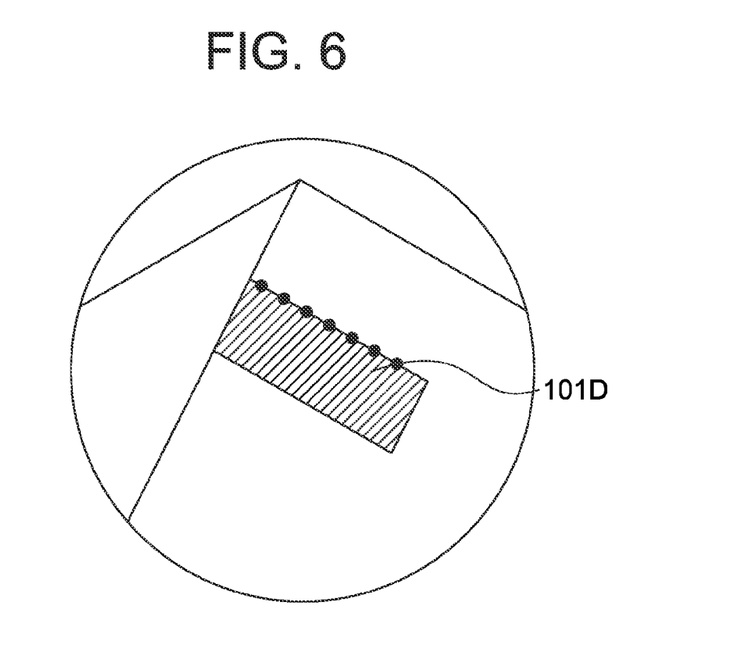
FIG. 6 shows an enlarged view of the position marker.

FIG. 6 shows an enlarged view of the position marker 101D. As shown in FIG. 6, the border line between the position marker 101D and the second plane 203 is made parallel to the first plane 201. That is, the z coordinate of any point at the border line shows a fixed value. Further, the length of the border line is such that it contains 5 or more points of measurement that are represented as black dots. The size of a point of measurement corresponds to the size of a pixel of the image measuring system. By way of example, the length of the border line ranges from 0.1 millimeters to 3.0 millimeters. Although the description given above and FIG. 6 are targeted to the position marker 101D, the description is also applicable to the other position markers.

According to the embodiment of the present invention, a position of a border line represented by plural pixels are clearly displayed in an image of an image measuring system so that x and y coordinates of the border line can be easily recognized. Further, at plural points of measurement that correspond to plural pixels, plural sets of x, y and z coordinates are determined, and the average value of the x coordinates, an average value of the y coordinates and the average value of the z coordinates are defined respectively as x, y and z coordinates of the position marker. Thus, variations in measurement values can be expected to be reduced by the use of the plural sets of x, y and z coordinates.

The surface generating diffuse reflection will be described below.

Figure 7A:
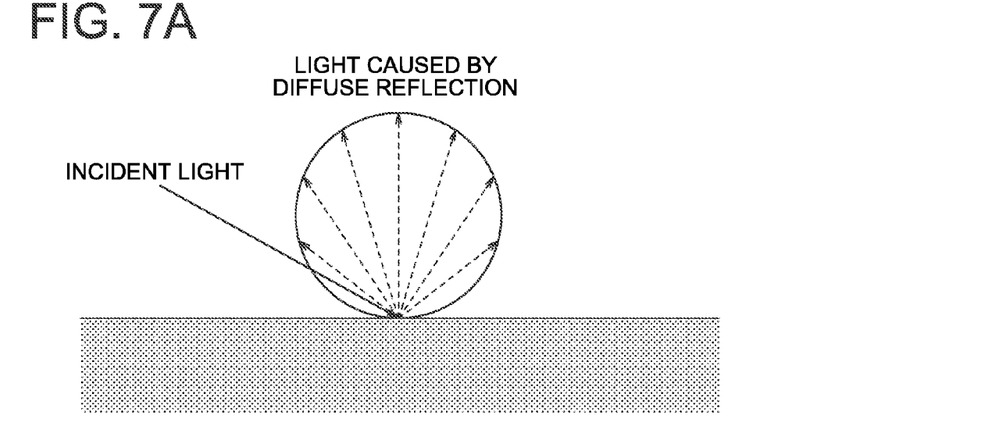
FIG. 7A to 7C illustrate reflection of light on the surface generating diffuse reflection.
Figure 7B:
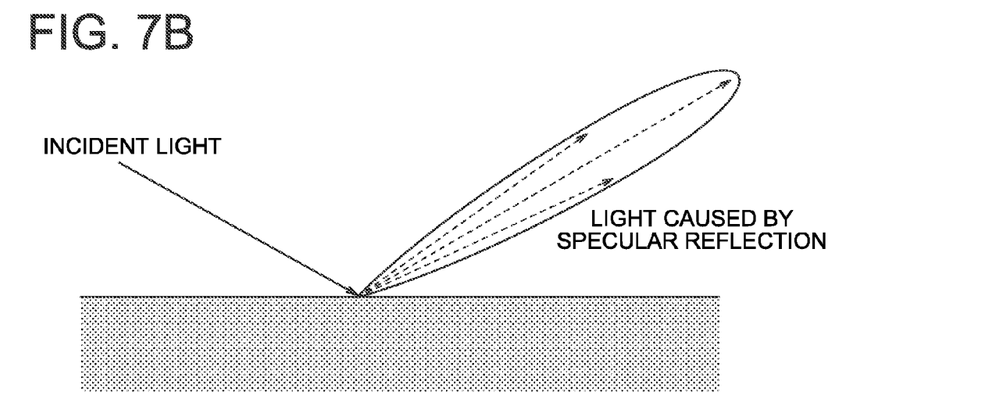
Figure 7C:
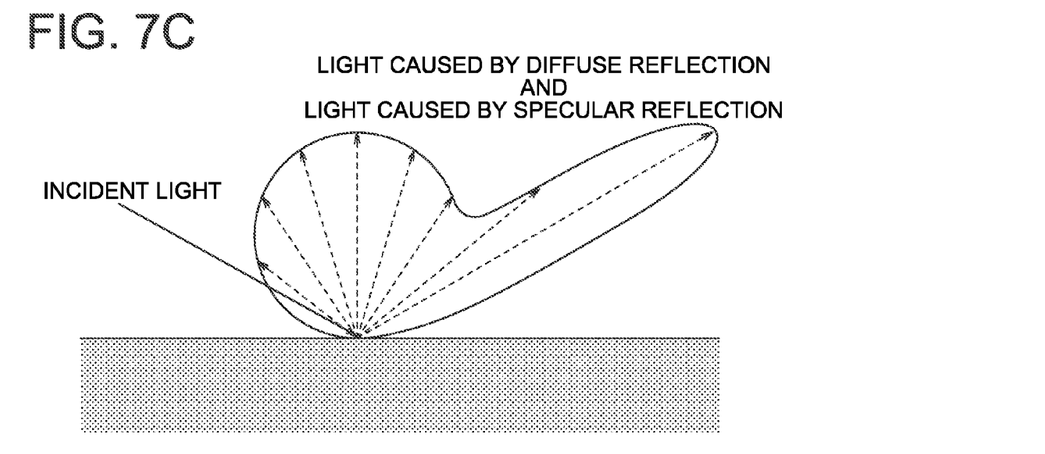

FIGS. 7A to 7C illustrate reflection of light on a surface generating diffuse reflection. FIG. 7A shows incident light and light caused by diffuse reflection. FIG. 7B shows incident light and light caused by specular reflection. FIG. 7C shows incident light, light caused by diffuse reflection and light caused by specular reflection. In general, a surface generating diffuse reflection shows characteristics shown in FIG. 7A or FIG. 7C.

An amount of luminous flux of light caused by diffuse reflection by a surface generating diffuse reflection will be estimated below. The whole amount ED of luminous flux of diffuse light is represented by the following equation.

$$E_D = E_0 - E_T - E_S - E_A \quad (1)$$

$E_0$ represents an amount of luminous flux of incident light, $E_T$ represents an amount of luminous flux of transmitted light, $E_S$ represents an amount of luminous flux of light caused by specular reflection, and $E_A$ represents an amount of luminous flux of absorbed light. The amounts of luminous flux described above are those for the unit area of the surface generating diffuse reflection, and the unit is lux. 1 lux equals to 1 lumen per square meter. $E_0$ corresponds to an amount of illuminance of the surface generating diffuse reflection.

Table 1 shows ratios of amounts of luminous flux of respective terms of Equation (1) to the amount $E_0$ of luminous flux of incident light for a plane without diffuse structure and surfaces generating diffuse reflection that are provided with various types of diffuse structure. The ratio of the amount of luminous flux of diffuse light to the amount $E_0$ of luminous flux of incident light, that is, the diffuse reflectance should preferably be 5.0% or more. When an element is manufactured by injection molding, a diffuse structure may be formed on a mold by etching, electrodischarge machining or the like so that the diffuse structure is transferred to a surface of the element.

TABLE 1

| Type of diffuse structure | $E_D$ | $E_0$ | $E_T$ | $E_S$ | $E_A$ |
|---|---|---|---|---|---|
| Plane without diffuse structure | 0.0% | 100.0% | 94.2% | 5.8% | 0.0% |
| Structure produced by etching | 16.7% | 100.0% | 83.3% | 0.0% | 0.0% |
| Structure produced by electrodischarge machining | 7.9% | 100.0% | 92.1% | 0.0% | 0.0% |
| Structure produced by sand blasting | 50.0% | 100.0% | 50.0% | 0.0% | 0.0% |
| White sheet (perfect diffuse reflection) | 96.0% | 100.0% | 0.0% | 0.0% | 4.0% |

Intensity of light in the direction at an angle $\theta_0$ with respect to a normal to the surface generating diffuse reflection, that is, luminance is represented by the following equation.

$$L_R = \frac{E_D \cos \theta_0}{2\pi} \quad (2)$$

The unit of luminance is candela per square meter. Candela is the unit of luminous intensity that represents luminous flux per solid angle, and corresponds to lumen per steradian. Accordingly, the unit of luminance is also lux per steradian.

When an angle of incidence of L1 to the position marker 101A in FIG. 5 is represented by $\theta_0$, the luminance in the direction of L1 can be obtained by Equation (2).

Table 2 shows values of $L_R$ obtained by Equation (2) for various values of angle of incidence and for surfaces generating diffuse reflection that are provided with various types of diffuse structure. The values of $L_R$ are represented as relative values that have been obtained by substituting the values of $E_D$ (unit of which is percent) in Table 1 into $E_D$ of Equation (2). "Angle of incidence" in Table 2 means $\theta_0$ in Equation (2).

TABLE 2

| Type of diffuse structure | Angle of incidence 45° | Angle of incidence 15° | Angle of incidence 30° | Angle of incidence 60° | Angle of incidence 75° |
|---|---|---|---|---|---|
| Plane without diffuse structure | 0.00% | 0.00% | 0.00% | 0.00% | 0.00% |
| Structure produced by etching | 1.88% | 2.57% | 2.30% | 1.33% | 0.69% |
| Structure produced by electrodischarge machining | 0.89% | 1.21% | 1.09% | 0.63% | 0.33% |

TABLE 2-continued

| Type of diffuse structure | Angle of incidence 45° | Angle of incidence 15° | Angle of incidence 30° | Angle of incidence 60° | Angle of incidence 75° |
|---|---|---|---|---|---|
| Structure produced by sand blasting | 5.63% | 7.69% | 6.89% | 3.98% | 2.06% |
| White sheet (perfect diffuse reflection) | 10.80% | 14.76% | 13.23% | 7.64% | 3.95% |

In Table 2, the minimum relative value of luminance is given in the case of structure produced by electrodischarge machining and for the value of angle of incidence of 75 degrees. The minimum relative value of luminance is 0.33%. Assuming a general case in which illuminance of the surface generating diffuse reflection is 50,000 lux when the angle of incidence is 0 degree (normal-incidence), the luminance in the case described above is 165 lux per steradian, which can be detectable without difficulty by a CCD or CMOS detector. On the other hand, in general, the diffuse reflectance of a surface on which a position marker is arranged, such as the second plane 203, is 0.1% or less. Accordingly, a position marker including the surface generating diffuse reflection can be recognized using light of diffuse reflection.

Table 3 shows typical values of depth (roughness) of various types of diffuse structure. Depth of any type of diffuse structure is less than 1 micrometer.

TABLE 3

| Type of diffuse structure | Typical value of depth |
|---|---|
| Structure produced by etching | 0.56 μm |
| Structure produced by electrodischarge machining | 0.80 μm |
| Structure produced by sand blasting | 0.04 μm |
| White sheet (perfect diffuse reflection) | Size of molecular structure |

An influence of roughness of a surface generating diffuse reflection on an accuracy in measurement of angle of the plane 203 will be studied below. A sufficient accuracy for measurement of angle is 0.3 degrees or less.

Figure 8:
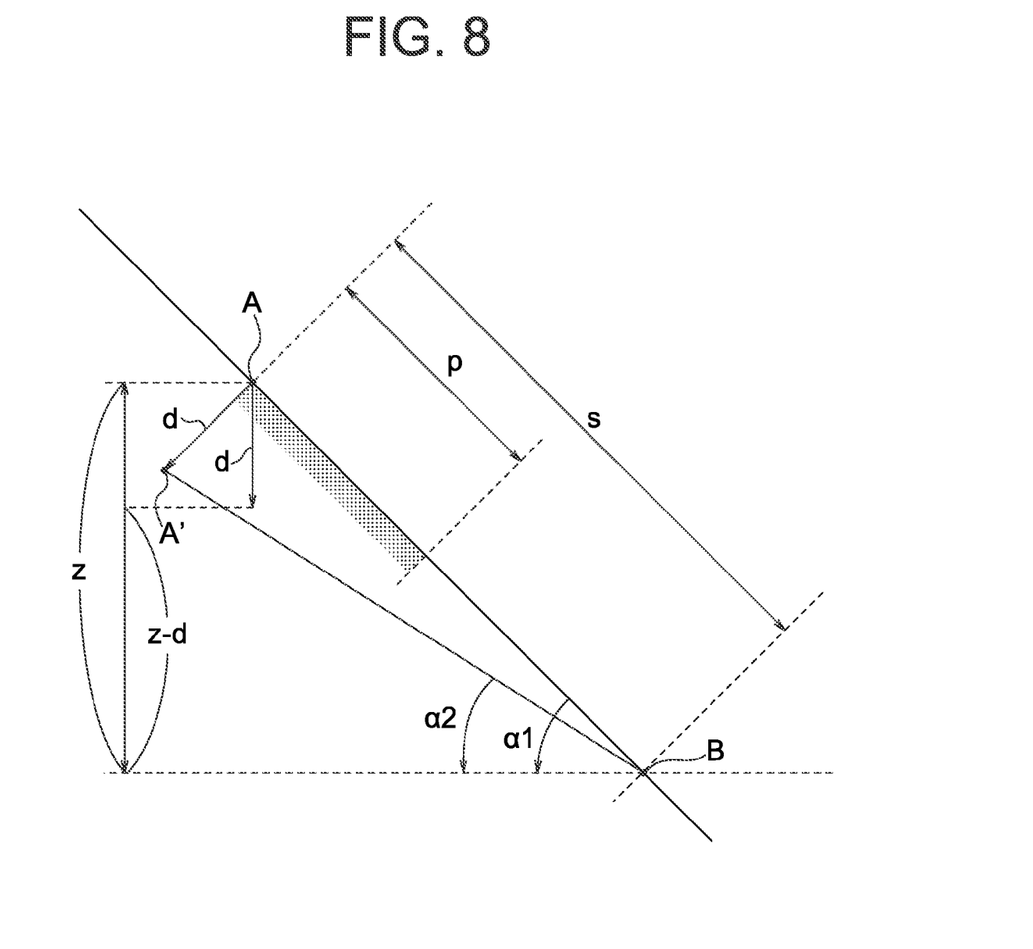
FIG. 8 shows a cross section that is in the direction of the maximum angle of inclination of the second plane provided with a position marker including a surface generating diffuse reflection.

FIG. 8 shows a cross section that is in the direction of the maximum angle of inclination of the second plane 203 provided with a position marker including a surface generating diffuse reflection. Assume that an angle that the plane 203 forms with the plane 201 is measured using point A and point B on the plane 203. The length of the position marker including a surface generating diffuse reflection in the direction of the maximum angle of inclination is represented as p. The distance between point A and point B is represented as s. A difference between the coordinate of point A and the coordinate of point B in the vertical direction, that is, the direction perpendicular to the plane 201 is represented as z. Further, assume that a depth of the diffuse structure is represented as d. The angle $\alpha_1$ of the plane 203 with respect to the plane 201 is represented by the following equation.

$$\arcsin\left(\frac{z}{s}\right) = \alpha_1$$

When the angle $\alpha_1$ is 75 degrees, the following value is obtained.

$$\frac{z}{s} = 0.9659$$

On the other hand, when the diffuse structure is present, a position of the bottom of the diffuse structure is represented as A', and a value of the angle the measured using point A' and point B is represented as $\alpha_2$. The angle $\alpha_2$ should be 74.7 degrees or more in order that a difference between the angle $\alpha_1$ and the angle $\alpha_2$ is 0.3 degrees or less. Provided that s is sufficiently greater than d, the following relationship holds concerning the measurement value of the angle $\alpha_2$ as shown in FIG. 8.

$$\arcsin\left(\frac{z-d}{s}\right) < \alpha_2$$

Accordingly, $\alpha_2$ is greater than 74.7 degrees when the following relationship holds.

$$\arcsin\left(\frac{z-d}{s}\right) = 74.7°$$

In this case, the following value is obtained.

$$\frac{z-d}{s} = 0.9646$$

Accordingly, assuming that d is 1 micrometer, a difference between the angle cu and the angle $\alpha_2$ can be made less than 0.3 degrees provided that s is 770 micrometers or more.

When the angle $\alpha_1$ is 45 degrees, the following value is obtained $$\frac{z}{s} = 0.7071$$

The angle $\alpha_2$ should be 44.7 degrees or more in order that a difference between the angle $\alpha_1$ and the angle $\alpha_2$ is 0.3 degrees or less. $\alpha_2$ is greater than 44.7 degrees when the following relationship holds.

$$\arcsin\left(\frac{z-d}{s}\right) = 44.7°$$

In this case, the following value is obtained.

$$\frac{z-d}{s} = 0.7034$$

Accordingly, assuming that d is 1 micrometer, a difference between the angle cu and the angle $\alpha_2$ can be made less than 0.3 degrees provided that s is 271 micrometers or more.

The distance between point A and point B corresponds to a distance between position markers. Accordingly, when a distance between position markers is 1 millimeter or more, measurement values of angle are not affected by roughness of the surface independently of the value of the angle α1.

Figure 9A:
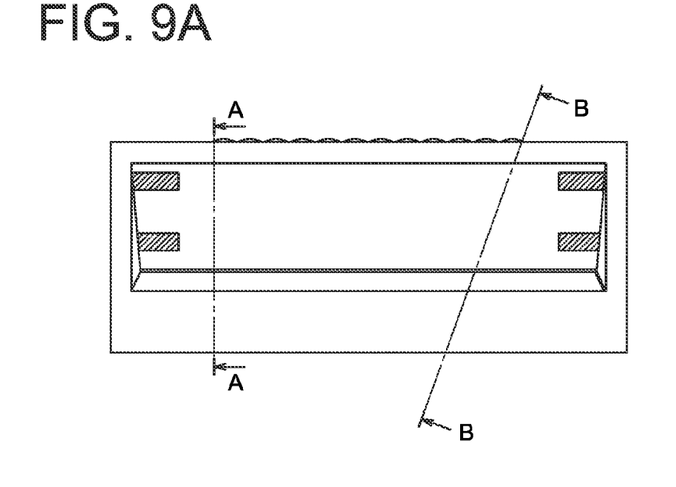
FIGS. 9A to 9C illustrate how to measure an angle formed by two planes of an element in a conventional method.
Figure 9B:
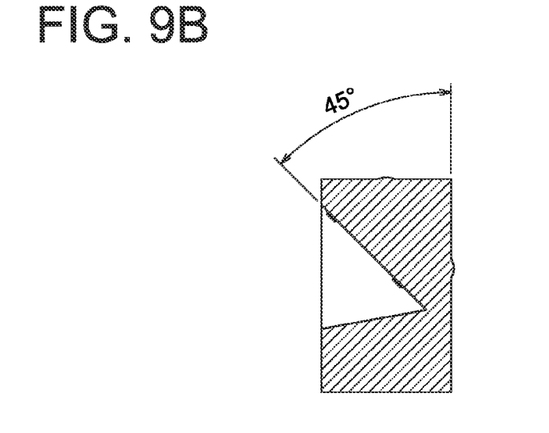
Figure 9C:
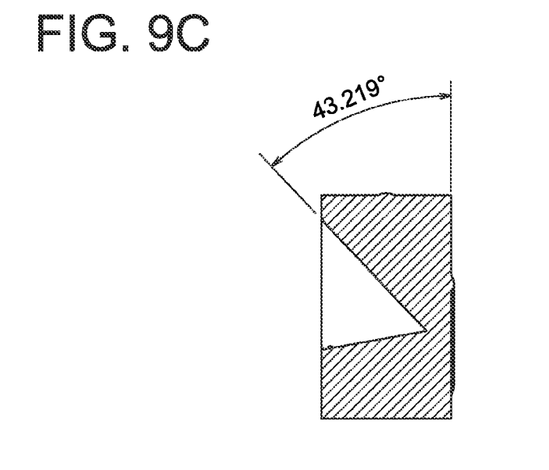

FIGS. 9A to 9C illustrate how to measure an angle formed by two planes of an element in a conventional method. FIG. 9A shows positions where angles are measured. The positions of cross sections marked with dot and dash lines AA and BB are positions of measurement. FIG. 9B shows a cross section of the element at the dot and dash line AA, and when an angle formed by the two planes is measured in this cross section, the angle is 45 degrees. FIG. 9C shows a cross section of the element at the dot and dash line BB, and when an angle formed by the two planes is measured in this cross section, the angle is 43.219 degrees. Thus, in a conventional method in which an angle is measured in a cross section of an element, the measured angle varies depending on a position of measurement (a direction of measurement). On the other hand, in the method according to the present invention, coordinates of positions of two planes are determined, and therefore the problem of variations described above will not occur.

Table 4 shows measurement values of an angle of a prism plane, which are obtained by a conventional method in which an angle is measured in a cross section of an element and the method according to the present invention. Numbers "1", "2" and "3" represent the first, the second and the third measurement values, respectively. The unit of angle is degree. "Average value" in Table 1 represents the average value of the three measurement values. The values of "6σ" in Table 1 are obtained by estimating values of σ (standard deviation) from the three measurement values and multiplying the values by 6. CP represents a process capability index that is a ratio of variation to the tolerance range. The values of CP in Table 1 are obtained by dividing the tolerance range by 6σ.

TABLE 4

| | Tolerance range | 1 | 2 | 3 | Average value | 6σ | CP |
|---|---|---|---|---|---|---|---|
| Present invention | 0.6 | 44.99 | 45.03 | 44.92 | 44.98 | 0.35 | 1.72 |
| Prior art | 0.6 | 44.80 | 44.99 | 44.75 | 44.85 | 0.76 | 0.79 |

In general, it can be determined that variations in measurement will sufficiently fall within the tolerance range if the value of CP is 1.33 or more. Accordingly, it is determined that a tolerance range of 0.6 degrees, that is, measuring accuracy of ±0.3 degrees can be obtained by the method according to the present invention.

Figure 10:
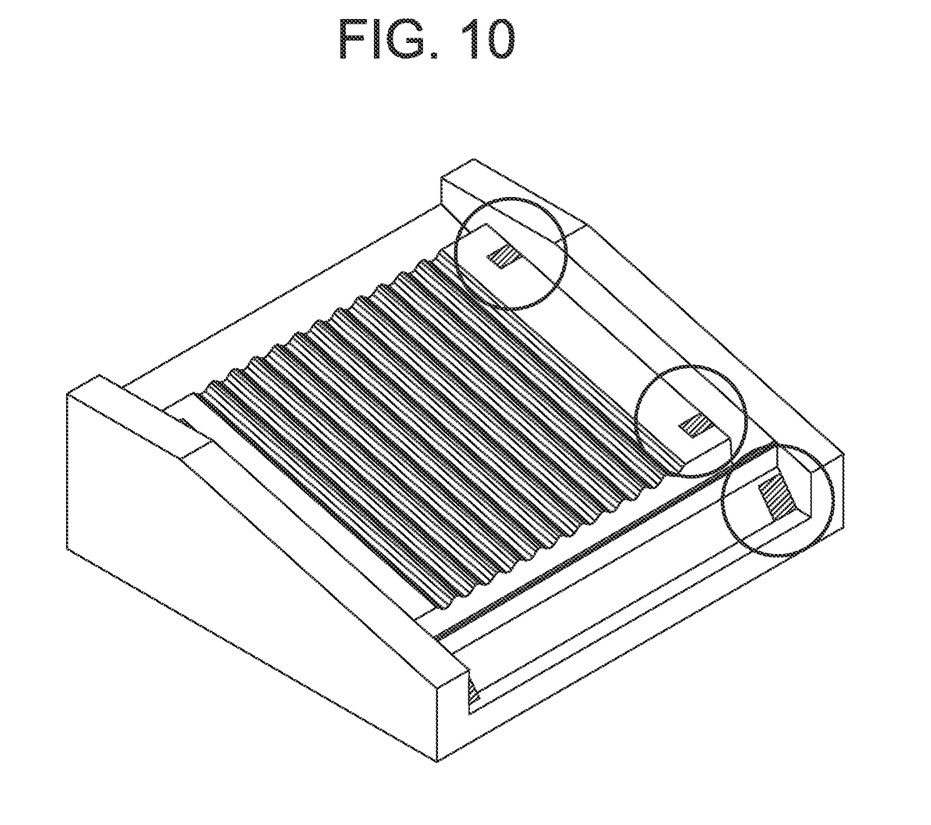
FIG. 10 shows an element provided with position markers on a surface provided with plural grooves for arranging optical fibers.

FIG. 10 shows an element provided with position markers on a surface provided with plural grooves for arranging optical fibers. In FIG. 10, position markers are encircled. In general, the present invention can be applied to elements provided with a prism plane, an entrance surface and an exit surface on which lenses are shaped, an entrance surface and an exit surface that are at an angle with each other, such a surface provided with plural grooves for arranging optical fibers as shown in FIG. 10, or the like.

In the embodiments described above, a single position marker forms a single portion for position determination. In general, a single position marker may have plural portions for position determination.

Figure 11A:
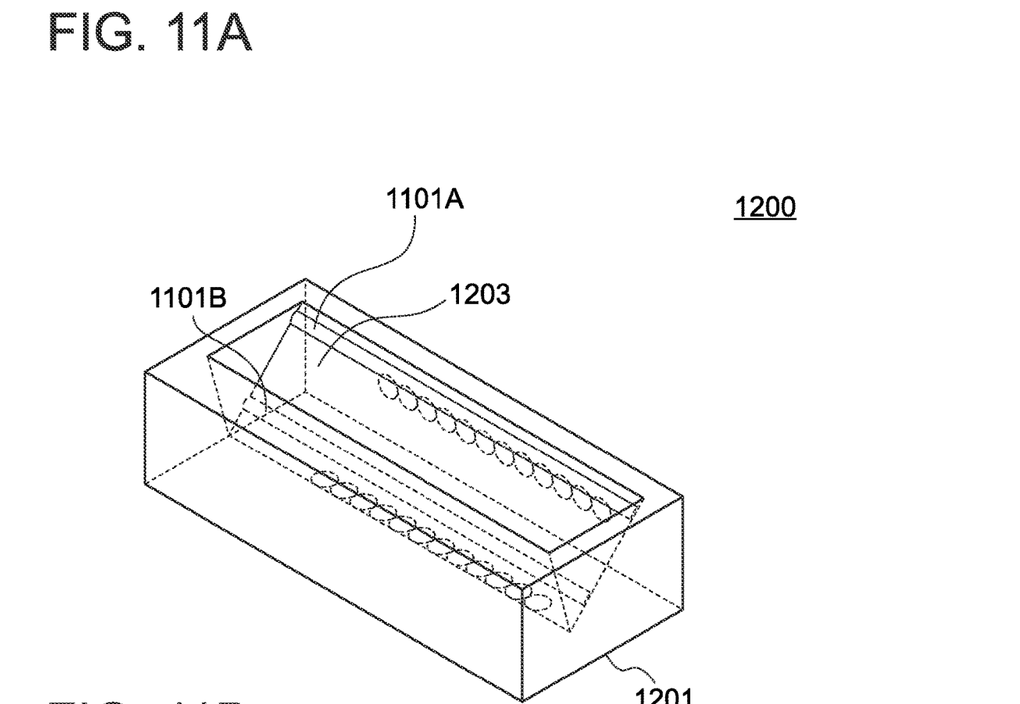
FIGS. 11A and 11B shows an element 1200 according to another embodiment of the present invention.
Figure 11B:
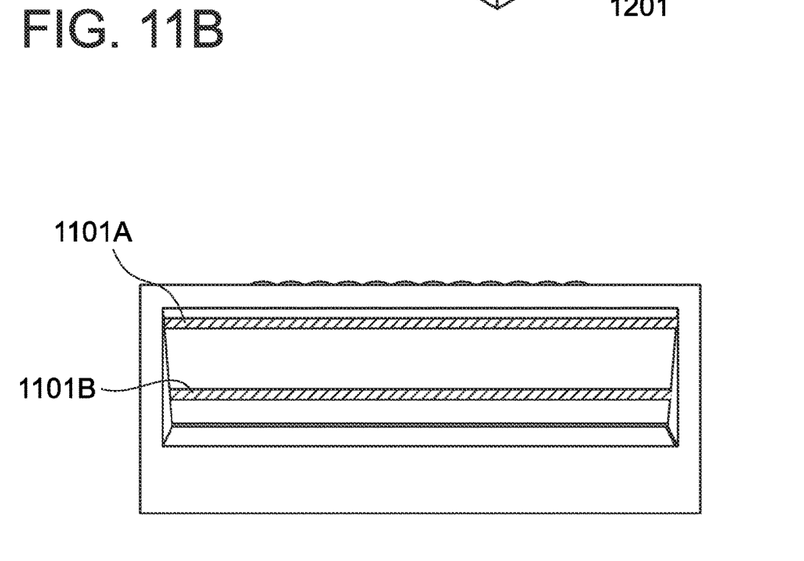

FIGS. 11A and 11B show an element 1200 according to another embodiment of the present invention. FIG. 11A is a perspective view of the element 1200, and FIG. 11B is a plan view of the element 1200. The element 1200 is provided with two linear position marker 1101A and 1101B on a plane 1203. By using at least three positions including a position on the position marker 1101A and a position on the position marker 1101B as portions for position determination, the angle formed by the plane 1203 and a plane 1201 can be measured.

Further, in general, a position of a surface including a curved surface can be determined by the present invention. A surface the position of which is determined is defined as a surface A. Plural portions for position determination are provided on the surface A. Each of the portions for position determination includes a surface generating diffuse reflection. The diffuse reflectance of the surface A is 0.1% or less, and the diffuse reflectance of the portions for position determination is 5% or more. When the surface A is illuminated by parallel light in a predetermined direction, rays of light are reflected in the direction of illumination only when they are reflected on a portion having a tangential plane that is perpendicular to the direction of illumination. Further, the portions for position determination are installed on a portion of the surface A the normal to which is at an angle in the range from 15 degrees to 75 degrees with the predetermined direction. Accordingly, if an image is taken from the direction of illumination, coordinates of the border lines of the portions for position determination can be obtained by the method shown in the flow chart of FIG. 3. In many cases, using the coordinates of the border lines of the portions for position determination thus obtained, the position of the surface A can be determined. By way of example, when the surface A is spherical, the center of the sphere can be determined as the point that is equidistant from a point on the border line of each of the three portions for position determination.

The invention claimed is:

1. A method for measuring a position of a target surface provided with portions for position determination thereon, wherein a diffuse reflectance of the target surface is 0.1% or less, and a diffuse reflectance of the portions for position determination is 5% or more, and
    wherein the target surface is configured such that a normal to a tangential plane at any point on the target surface where each of the portions for position determination is installed forms an arbitrary angle between 15 degrees and 75 degrees inclusive with a certain direction,
    the method including the steps of:
    illuminating the target surface with parallel light in the certain direction;
    determining positions of border lines of the plural portions for position determination from an image of the target surface; and
    determining the position of the target surface from the positions of the border lines of the plural portions for position determination.

2. A method according to claim 1, wherein the target surface is a surface of an element provided with a first plane and a second plane forming an angle between 15 degrees and 75 degrees inclusive with the first plane, the target surface is the second plane, and the element is provided with at least three portions for position determination on the second plane, the portions for position determination being arranged such that spacing between the portions for position determination is great enough to locate the second plane, and wherein in the step of illuminating the target surface, the second plane is illuminated with parallel light that is perpendicular to the first plane.

3. A method according to claim 2, further including the step of determining an angle between the first plane and the second plane using the positions of the second plane.

4. A method for measuring an angle according to claim 2, wherein the position of each of the border lines of the at least three portions for position determination is obtained using plural pixels in the image.

5. An element having a first plane and a second plane that is at an angle between 15 degrees and 75 degrees inclusive with the first plane,
   wherein the second plane is provided with at least three portions for position determination thereon, the portions for position determination being arranged such that spacing between the portions for position determination is great enough to locate the second plane, and
   wherein a diffuse reflectance of the second plane is 0.1% or less, and a diffuse reflectance of the portions for position determination is 5% or more.

6. An element according to claim 5, wherein the at least three portions for position determination are arranged on the periphery of the second plane.

7. An element according to claim 5, provided with four portions for position determination.

8. An element according to claim 5, wherein each of the at least three position markers corresponds to a single portion for position determination.

9. An element according to claim 8, wherein the length of the border line of each position marker is from 0.1 millimeters to 3.0 millimeters and the length of each position marker in the direction of the border line is equal to the length of the border line.

10. An element according to claim 5, provided with at least two position markers including at least one position marker corresponding to plural portions for position determination.

11. An element according to claim 5, used for optical applications.

12. An element according to claim 11, wherein at least one of the first plane and the second plane is a prism plane, a plane for arranging a lens or a plane for installing an optical fiber.

* * * * *